No. 810,621. PATENTED JAN. 23, 1906.
J. COOPER.
AUTOMATIC OILER.
APPLICATION FILED AUG. 26, 1905.
Fig. 1.
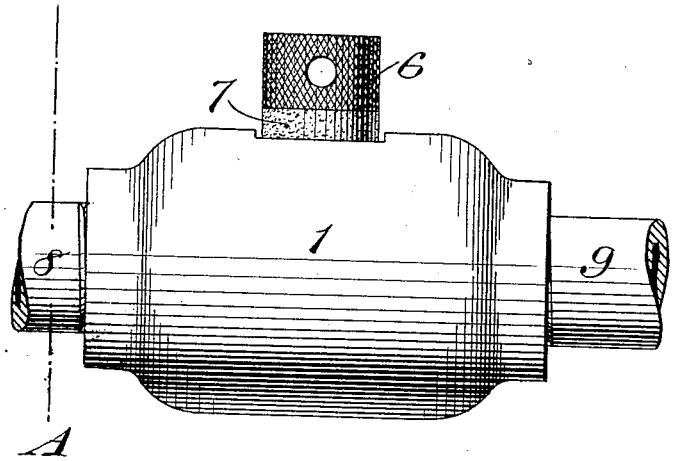
Fig. 2.
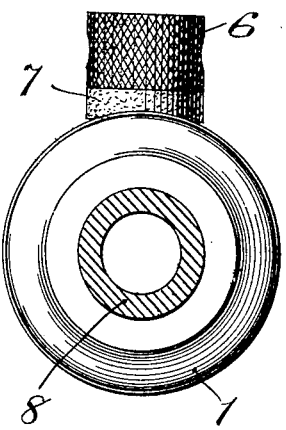
Fig. 3.
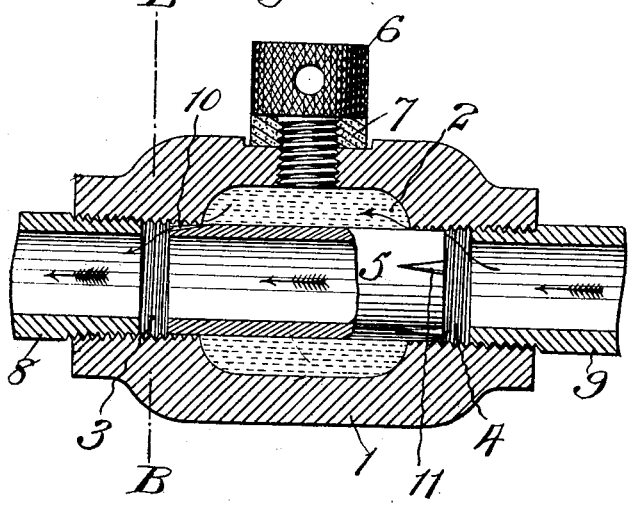
Fig. 4.
Witnesses:
F. George Barry
Henry Thieme
Inventor:
John Cooper
by attorneys

UNITED STATES PATENT OFFICE.

JOHN COOPER, OF BELLEVUE, PENNSYLVANIA, ASSIGNOR TO THE INGERSOLL-SERGEANT DRILL COMPANY, OF NEW YORK, N. Y., A CORPORATION OF WEST VIRGINIA.

AUTOMATIC OILER.

No. 810,621.     Specification of Letters Patent.     Patented Jan. 23, 1906.

Application filed August 26, 1905. Serial No. 275,850.

*To all whom it may concern:*

Be it known that I, JOHN COOPER, a citizen of the United States, and a resident of Bellevue, in the county of Allegheny and State of Pennsylvania, have invented a new and useful Improvement in Automatic Oilers, of which the following is a specification.

The object of my invention is to provide an automatic oiler for use in connection with air-feed pipes—as, for instance, the air-feed pipe of a pneumatic motor—which oiler is of such construction that small quantities of oil will be drawn into the air-feed pipe when air is passed therethrough.

A practical embodiment of the invention is represented in the accompanying drawings, in which—

Figure 1 represents the automatic oiler in side elevation with portions of the air-feed pipe shown attached thereto. Fig. 2 is a transverse section in the plane of the line A A of Fig. 1. Fig. 3 is a longitudinal central section through the oiler and adjacent parts of the air-feed pipe, the oiler-tube being shown partially in side elevation; and Fig. 4 is a transverse section taken in the plane of the line B B of Fig. 3 looking in the direction of the arrows.

The oiler comprises a reservoir 1, its oil-chamber 2, contracted bores 3 and 4 communicating with the chamber 2, and a tube 5 leading through the reservoir-chamber having its ends extended into the said bores 3 and 4. A removable cap 6 is arranged to open and close communication to the oil-chamber 2 for purposes of filling the same. A washer 7 serves to seal the cap 6, so as to prevent the leakage of oil around the cap. The contracted bores 3 and 4 of the reservoir-chamber are screw-threaded and have attached thereto adjacent ends of two portions 8 and 9 of an air-jacent ends of two portions 8 and 9 of an air-feed pipe—such, for instance, as the air-feed pipe of a pneumatic motor. (Not shown herein.) Communication is established between the bores 3 and 4 beyond the ends of the tube 5 and the reservoir-chamber 2 through a plurality of small ducts, which ducts in the present instance are formed in the exterior walls of the tube. These ducts are tapered in form, with their small ends opening into the chamber 2 and their larger ends into the bores 3 and 4. The ducts leading from the chamber 2 to the bore 3 beyond the end of the tube 5 are denoted by 10, and the ducts leading from the chamber 2 to the bore 4 at the other end of the tube 5 are denoted by 11. When the air is passed through the air-feed pipe in the direction of the arrow, Fig. 3, oil will be sucked in small quantities through the ducts 10 from the chamber 2 into the air as it passes through the tube 5 and the portion 8 of the air-feed pipe. At the same time small quantities of air are permitted to pass from the portion 9 of the pipe through the ducts 11 into the chamber 2 to prevent a vacuum being formed therein and to assist in the escape of oil from the chamber at the other end thereof into the air-feed pipe. The ducts leading from the chamber to the air-feed pipe upon opposite ends of the tube 5 are so small that when air is not being passed through said pipe little, if any, oil will be permitted to escape from the reservoir into the air-feed pipe.

It will be understood that the tube 5 may be driven into its position with its ends snugly into engagement with the contracted bores 3 and 4 and that the oiler may be used equally well whether the air be passed therethrough in the one or the other direction.

It will furthermore be seen that the required amount of oil may be fed to the air in a very simple and inexpensive manner by the use of the oiler herein described.

What I claim as my invention is—

1. An automatic oiler for an air-feed pipe comprising a reservoir having its chamber provided with contracted bores for the attachment of adjacent ends of air-feed-pipe sections, a tube leading through the chamber having its ends located in said contracted bores and ducts for opening communication from the chamber to the air-feed-pipe sections at the opposite ends of the said tube.

2. An automatic oiler for an air-feed pipe comprising a reservoir having its chamber provided with contracted bores for the attachment of the adjacent ends of air-feed-pipe sections, a tube leading through the chamber having its ends located in said contracted bores and ducts in the exterior walls of the ends of the tube for opening communication from the chamber to the air-feed-pipe sections for permitting the escape of oil at one end of the tube and the admission of air at the other end of the tube.

3. An automatic oiler for an air-feed pipe comprising a reservoir having its chamber provided with contracted bores for the attachment of the adjacent ends of the air-feed-pipe sections, a tube leading through the chamber having its ends fitted to the said bores, there being ducts for opening communication between the chamber and the air-feed-pipe sections at the opposite ends of the tube for permitting the escape of oil in small quantities at one end of the tube and the admission of air in small quantities at the other end of the tube and an air-tight filling-cap for the said chamber.

4. An automatic oiler for an air-feed pipe comprising a reservoir having its chamber provided with contracted bores for the attachment of the adjacent ends of the air-feed-pipe sections, a tube leading through the chamber having its ends fitted to the bores and ducts at the opposite ends of the tube for permitting the escape of oil from the chamber at the one or the other end of the tube according to the direction of flow of air through the air-feed pipe and the admission of air from the pipe to the chamber at the opposite end of the tube from the end where the oil is permitted to escape.

In testimony that I claim the foregoing as my invention I have signed my name, in presence of two witnesses, this 16th day of August, 1905.

JOHN COOPER.

Witnesses:
JAMES A. BRADLEY,
F. P. KOHEN.